United States Patent
Tsai et al.

(10) Patent No.: US 7,853,356 B2
(45) Date of Patent: Dec. 14, 2010

(54) METHOD FOR OPTIMIZING A ROBOT PROGRAM AND A ROBOT SYSTEM

(75) Inventors: Jason Tsai, Bloomfield Hills, MI (US); Yi Sun, West Bloomfield, MI (US); Sai-Kai Cheng, Rochester Hills, MI (US); Min Ren Jean, Rochester Hills, MI (US); Hadi Akeel, Sterling, VA (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 929 days.

(21) Appl. No.: 11/279,764

(22) Filed: Apr. 14, 2006

(65) Prior Publication Data

US 2007/0244599 A1    Oct. 18, 2007

(51) Int. Cl.
*G06F 19/00* (2006.01)

(52) U.S. Cl. .................. 700/245; 700/246; 700/247; 700/249; 700/251; 700/252; 700/253; 700/257; 700/262; 318/568.17; 318/568.22; 318/568.24; 703/22; 706/920

(58) Field of Classification Search ............. 700/245, 700/246, 247, 249, 251, 252, 253, 262, 257; 318/568.17, 568.22, 568.24; 703/22; 706/920
See application file for complete search history.

(56) References Cited

U.S. PATENT DOCUMENTS

| | | | |
|---|---|---|---|
| 4,338,672 A | | 7/1982 | Perzley et al. |
| 4,433,382 A | * | 2/1984 | Cunningham et al. ....... 700/192 |
| 4,763,055 A | * | 8/1988 | Daggett et al. ......... 318/568.14 |
| 4,876,494 A | * | 10/1989 | Daggett et al. ......... 318/568.22 |
| 4,956,594 A | * | 9/1990 | Mizuno et al. ........... 318/568.1 |
| 5,218,709 A | * | 6/1993 | Fijany et al. .................. 712/22 |
| 5,313,695 A | | 5/1994 | Negre et al. |
| 5,327,058 A | | 7/1994 | Rembutsu |
| 5,341,458 A | * | 8/1994 | Kaneko et al. .............. 700/245 |
| 5,465,035 A | | 11/1995 | Scaramuzzo, Jr. et al. |
| 5,796,922 A | | 8/1998 | Smith |
| 5,875,286 A | | 2/1999 | Bernstein et al. |

(Continued)

FOREIGN PATENT DOCUMENTS

JP    2002-292584 A    10/2002

OTHER PUBLICATIONS

Blomdell A. et al., Extending an industrial robot controller, Sep. 2005, IEEE robotics and automation magazine, pp. 8594.*

(Continued)

*Primary Examiner*—Khoi Tran
*Assistant Examiner*—Jaime Figueroa
(74) *Attorney, Agent, or Firm*—Fraser Clemens Martin & Miller LLC; William J. Clemens

(57) ABSTRACT

An apparatus and a method for optimizing robot performance includes a computer connected to the robot controller for receiving performance data of the robot as the controller executes a path program. The computer uses the performance data, user specified optimization objectives and constraints and a kinematic/dynamic simulator to generate a new set of control system parameters to replace the default set in the controller. The computer repeats the process until the new set of control system parameters is optimized.

16 Claims, 3 Drawing Sheets

U.S. PATENT DOCUMENTS

| | | | |
|---|---|---|---|
| 5,880,956 A | | 3/1999 | Graf |
| 6,002,104 A * | | 12/1999 | Hsu .................. 219/130.5 |
| 6,011,241 A * | | 1/2000 | Rongo ................ 219/124.34 |
| 6,175,206 B1 * | | 1/2001 | Ueno et al. ............ 318/568.1 |
| 6,212,466 B1 | | 4/2001 | Ulyanov et al. |
| 6,269,284 B1 * | | 7/2001 | Lau et al. ................ 700/193 |
| 6,327,516 B1 * | | 12/2001 | Zenke ................... 700/245 |
| 6,445,964 B1 * | | 9/2002 | White et al. .............. 700/61 |
| 6,560,513 B2 * | | 5/2003 | Krause et al. ............ 700/264 |
| 6,812,665 B2 * | | 11/2004 | Gan et al. ............. 318/568.11 |
| 7,194,321 B2 * | | 3/2007 | Sun et al. .............. 318/400.01 |
| 7,525,274 B2 * | | 4/2009 | Kazi et al. .............. 318/568.1 |
| 2002/0147528 A1 * | | 10/2002 | Watanabe et al. ......... 700/245 |
| 2004/0135534 A1 * | | 7/2004 | Cullen ................... 318/609 |
| 2004/0148268 A1 | | 7/2004 | Reil |
| 2004/0193321 A1 | | 9/2004 | Anfindsen et al. |
| 2004/0267404 A1 | | 12/2004 | Danko |
| 2005/0027394 A1 | | 2/2005 | Graf et al. |
| 2005/0071048 A1 * | | 3/2005 | Watanabe et al. ......... 700/259 |
| 2005/0143860 A1 * | | 6/2005 | Nakajima et al. ......... 700/245 |
| 2005/0251290 A1 * | | 11/2005 | Skourup et al. .......... 700/245 |
| 2006/0190136 A1 * | | 8/2006 | Boyer .................... 700/245 |

OTHER PUBLICATIONS

Sommer Egon et al. ,SpeedFace—A real time window to robot control, 2003, CAN in automation, pp. 10-14.*

Aspragathos N.A. and Foussias S., Optimal location of a robot path when considering velocity performance, 2002, Robotica, pp. 139-147.*

Feldmann Klaus et al. , Fast sensor guidance of industrial robots,1999, Robotica, pp. 17-21.*

Kawasaki Heavy Industries,Ltda, Kawasaki robot controller,no date, 4 pages.*

Motoman, Robot control system Motoman-NX100, 2004, 4 pages.*

Kazi, Arif et al., Design Optimization of Industrial Robots using the Modelica Multi-physics Modeling Language, Proceedings of the $33^{rd}$ ISR (International Symposium on Robotics) Oct. 7-11, 2002, pp. 1-5.*

Heim, Alexander et al., Trajectory Optimization of Industrial Robots with Application to Computer-Aided Robotics and Robot Controllers, 2000, Optimization: A Journal of Mathematical Programming and Operations Research, 1029-4945, vol. 47, Issue 3, pp. 407-420 (1-14).*

M. Schlemmer et al., Real-Time Collision-Free Trajectory Optimization of Robot Manipulators via Semi-Infinite Parameter Optimization, Sep. 1998, The International Journal of Robotics Research, vol. 17, No. 9, pp. 1013-1021.*

Resit Soylu et al., Linearization and Optimization of robot Dynamics via Inertial Parameter Design, Mar. 1996, Journal of Robotic Systems 13(8), pp. 527-538.*

A. Schiela et al., Mixed-mode integration for Real-time simulation, Oct. 23-24, 2000, Modelica Workshop 2000 Proceedings, Sweden, pp. 69-75.*

* cited by examiner

METHOD FOR OPTIMIZING A ROBOT PROGRAM AND A ROBOT SYSTEM

BACKGROUND OF THE INVENTION

The present invention relates generally to a method and an apparatus for modifying a robot control program to meet performance objectives.

The closest prior art to this invention is based on the following principle:

A robot controller connects to an external computing device such as a personal computer through communication link. The external device (e.g. a personal computer or "PC") accesses the memory area of robot controller. User programs stored in the memory area can therefore be manipulated by the external device.

The main concept of this prior art device is for either connecting multiple robots to transfer user programs or for data storage purposes. There is no real-time interaction between the robot controller and the external computing device for path performance optimization.

SUMMARY OF THE INVENTION

The present invention concerns a method and an apparatus for robot controller operation optimization. The present invention does not only use a communication channel to connect the robot controller and the external computing device (a general PC), but makes use of the CPU power of the external PC to analyze and optimize the robot path real-time. This external PC becomes a highly flexible, re-configurable, and yet powerful second processor for the robot controller.

The method and apparatus according to the present invention are extremely useful for small shape cutting/generation because the quality of these types of processes is tedious and time-consuming to examine and verify. Also, the method and apparatus can optimize robot path and cycle time for load-unload and other material handling applications successfully. Furthermore, the method and apparatus lay the perfect groundwork for extended robot optimization in other applications such as palletizing, spot welding, etc.

DESCRIPTION OF THE DRAWINGS

The above, as well as other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
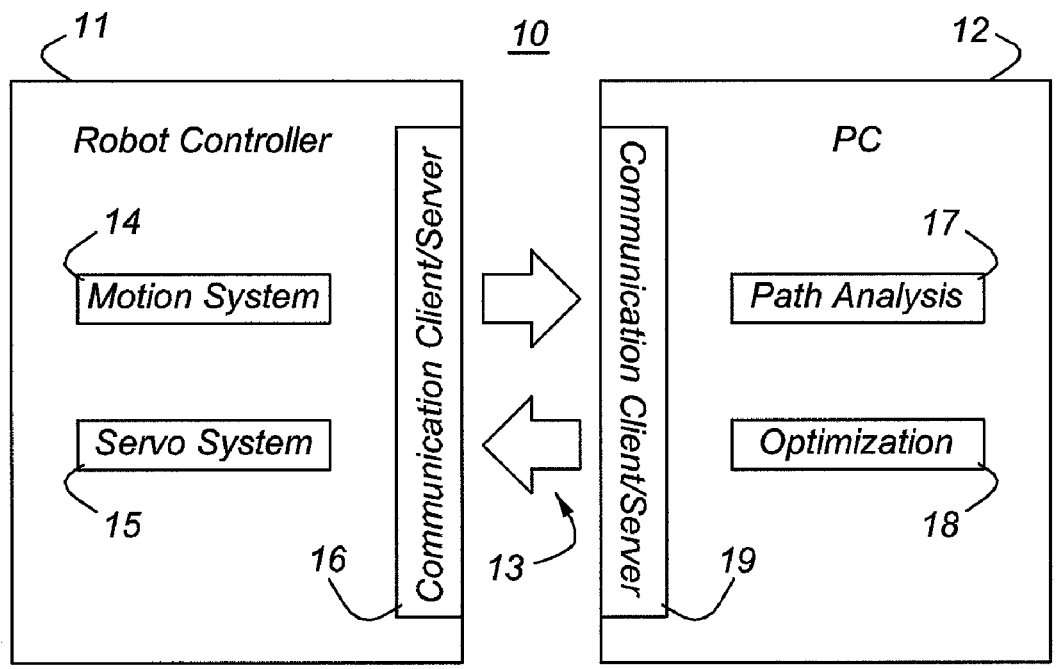
FIG. 1 is a block diagram of a robot program optimization apparatus in accordance with the present invention.

Traditionally, a robot program is developed and occasionally optimized independently of the robot system to meet some performance objectives such as higher accuracy or better cycle time. When the program is executed on different robots, that are not usually exactly identical, the robots' performances usually vary and some may not meet the desired objectives. This variation is attributed to the need of different manipulators for different "system parameters" such as acceleration time, over-current protection limits, servo loop gains, coulomb friction parameters, integration gains, spring constants, etc, that are usually fixed for specific manipulator models.

The present invention recognizes that differences between manipulators and operating conditions affect robot performance and provides a method to optimize the robot program as well as the system parameters according to the robot system (control and manipulator) and the operating conditions. The robot program, which may be developed in traditional ways, is executed by the robot system for which certain parameters, usually encoder positional data and motor current data, are monitored and communicated during robot operation to a secondary processor for optimization. During the operation of the robot, the secondary processor applies optimization routines to meet predetermined objectives, and modifies not only the robot program but also the control system parameters. The optimization takes into consideration the overall robot model, not just individual drive axes, and monitors the trend of specific composites of performance parameters to arrive at optimum control system parameters. This process is repeated while the robot is operational until the optimization objectives are met at which time the program is finalized and the system parameters are set for productive operation.

The related prior art includes offline programming in which the robot program is modified using a secondary processor, usually offline, to meet certain objectives. The modifications are done independently of the control system parameters and are not checked in real-time against actual performance. Accordingly, the same program may be executed differently by different manipulators or by the same manipulator under different operating conditions.

Learning control also modifies the robot program in real-time and may modify some control system parameters. However, in learning control optimizing iterations are run on an interval by interval basis where the state condition of the servo system changes with risk of instability. With its inherent slow conversion process only a few parameters can be iterated, usually servo gains and damping coefficients.

The present invention iterates at a fixed state on the PC for faster conversion and no risk of instability. This also allows more control parameters to be optimized within a given time period, hence better optimization of performance.

Unlike the present invention, none of the prior art methods accommodate input from the motor current that is essential to avoid overloading the motors and degrading the durability of the robot. Neither do they accommodate changes in the spring constants hence compromising vibration performance of the robot.

The present invention uses an iterative approach to evaluate predictive changes to the control parameters on the PC, using the dynamic robot model. Unlike learning control which must use the actual robot to evaluate the effect of changes, the present invention can run the model on the PC many more times under the same conditions and only applies the change once an objective is attained. This fast iterative approach also avoids the risk of instability.

Accordingly, the present invention combines the advantages of offline programming, where the program modifications can be run independently of the robot, with learning control where iterative operations lead to optimized parameters. In learning control the iteration is run on an interval by interval basis where the state condition of the servo system changes with risk of instability, but the present invention iterates at a fixed state for faster conversion and no risk of instability. Furthermore, in learning control, a change in one parameter can not be evaluated under the same dynamic state condition until the whole program has been executed, a very slow process. Also, the approach of learning control is compromised by making the evaluation on the following time interval under a new state condition. This makes stability of the iteration difficult to attain.

Robot path optimization is a CPU-intensive task and is highly dependent on the robot TCP position and robot arm configuration. In addition, the CPU in a robot controller usually handles excessive tasks such as motion planning, program management, and memory management etc. Therefore, it has been difficult to achieve path optimization with the robot controller's main CPU in the past. The method and apparatus according to the present invention provide the feasible measure to make real-time robot path optimization possible.

The main concept of this invention is to interact an external computing device (a general PC) with a robot controller real-time. The feedback of motion performance can be displayed to users on any PC with a network card through either a dedicated connection between the robot controller and the PC, or via a network. This visual display can provide useful information from the controller such as path deviation and cycle time with or without the actual process taking place.

To visualize motion performance and display to the user every time when the program executes, critical motion data and system/servo status will be transmitted to the PC real-time. Also, each record will be analyzed and stored for future reference based on the user's desire. After the analysis, the CPU power of the external PC will be used to calculate the compensation data for the optimization iteration. This important compensation data will then be transmitted back to the robot controller real-time and the next iteration trial will be started automatically. This process will continue until the user-defined criterion is met.

There is shown in FIG. 1 an apparatus 10 for the optimization of a robot control program in accordance with the present invention. A first control means 11, such as a robot controller, is connected to a second control means 12, such as a personal computer (PC), by a communication link 13 such as a computer network. Although a PC is preferred for the second control means, any suitable computer can be used. The controller 11 includes a motion system 14, a servo system 15 and a communication client/server 16. The PC 12 includes a path analysis module 17, an optimization module 18 and a communication client/server 19.

Figure 2:
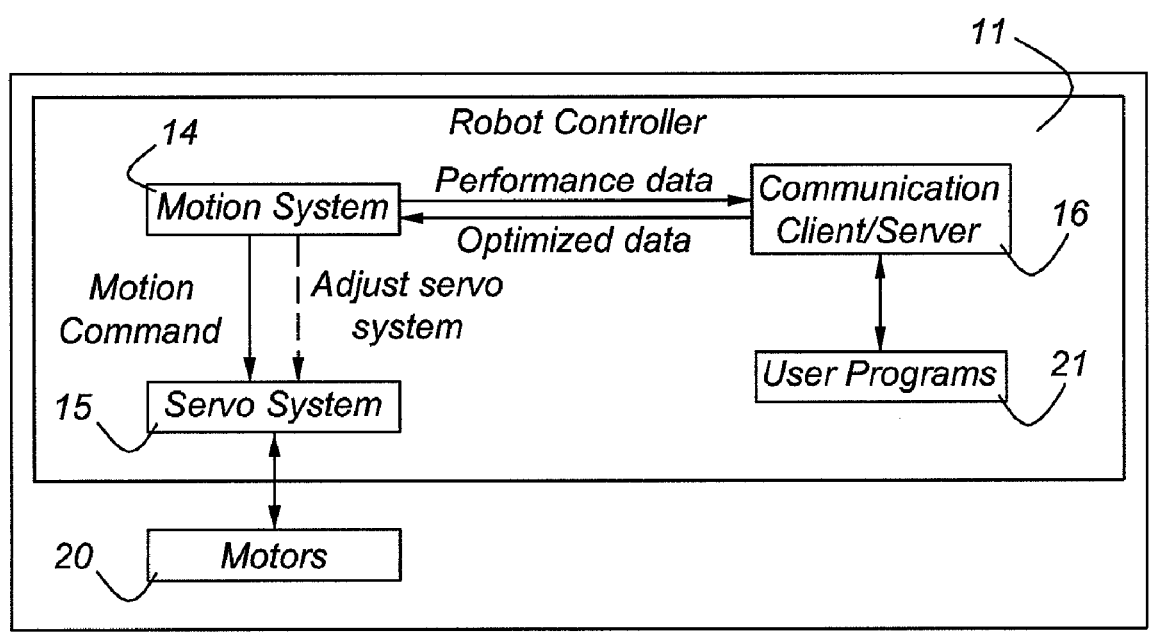
FIG. 2 is block diagram of the robot controller shown in FIG. 1.

As shown in FIG. 2, in the robot controller 11 the motion system 14 is connected to the servo system 15 and executes a control program to generate "motion commands" and "adjust servo system" signals to the servo system 15. The servo system 15 is connected to motors 20 of the robot and executes the motion commands to operate the motors 20 and receives feedback signals including motor current from the motors 20. Multiple control programs can be stored in a user programs memory 21 connected to the communications server/client 16. The motion system 14 sends "performance data" to and receives "optimized data" from the communication server/client 16. The "optimized data" is used to generate the "adjust servo system" signals to optimize performance.

Figure 3:
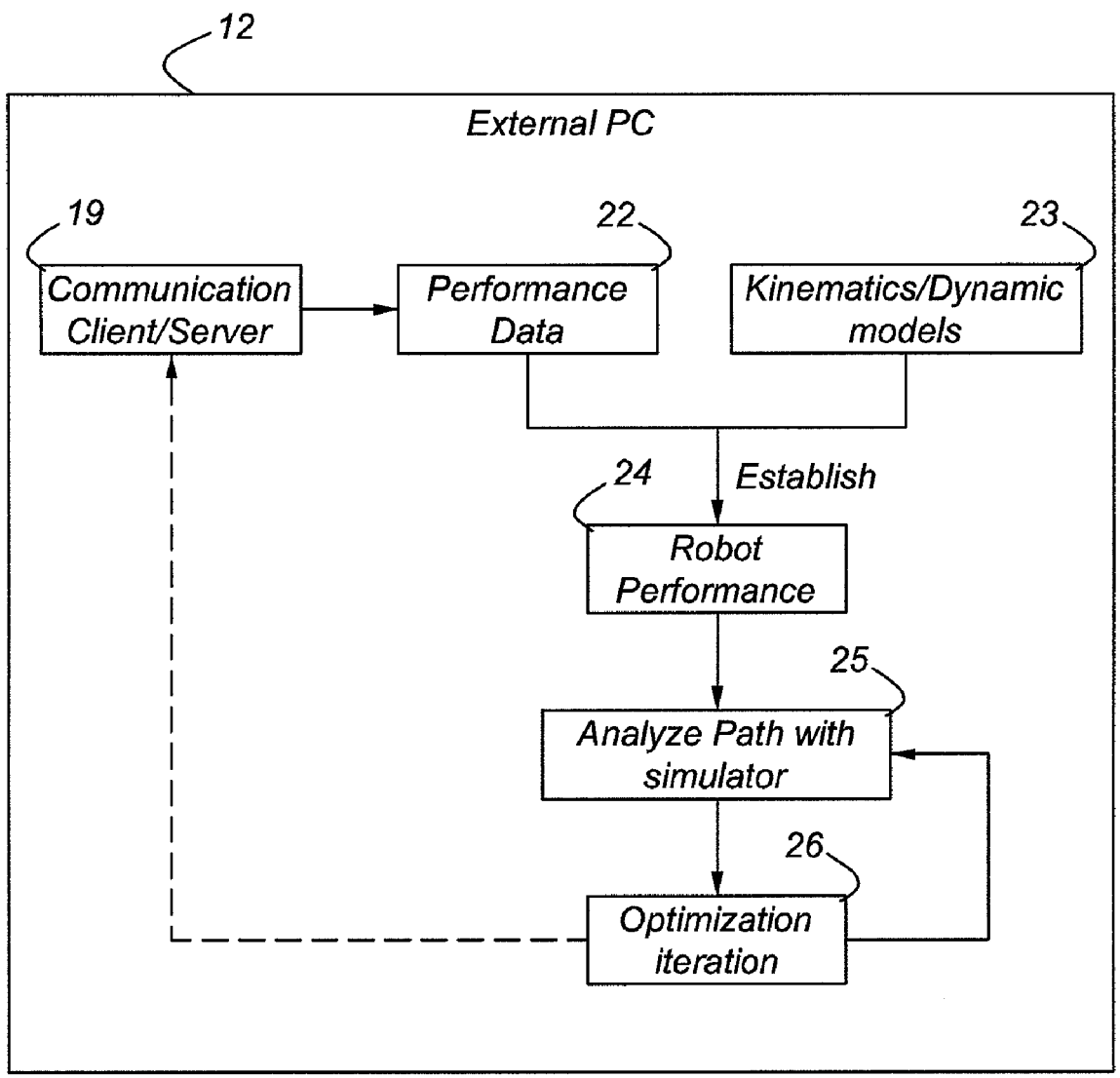
FIG. 3 is a block diagram of the external personal computer shown in FIG. 1.

The external PC 12 is shown in FIG. 3 as including the communication server/client 19 that is connected to deliver the "performance data" to a performance data memory 22. A kinematic/dynamic models memory 23 stores such models of the robot. The data memory 22 and the models memory 23 are connected to a robot performance module 24 to "establish" the actual performance of the robot. The module 24 is connected to an analyze path with simulator module 25 that utilizes simulation to analyze the robot path based upon the robot performance. The result from the module 25 is provided to an optimization iteration module 26. The "optimized data" from the module 26 is returned to the simulator module 25 via a feedback loop to check the path based upon the "optimized data". Upon confirmation that the "optimized data" produces better performance of the robot, the "optimized data" is sent in real time to the motion system of FIG. 2 through the communication server/clients 19 and 16 of the communications link 13.

Figure 4:
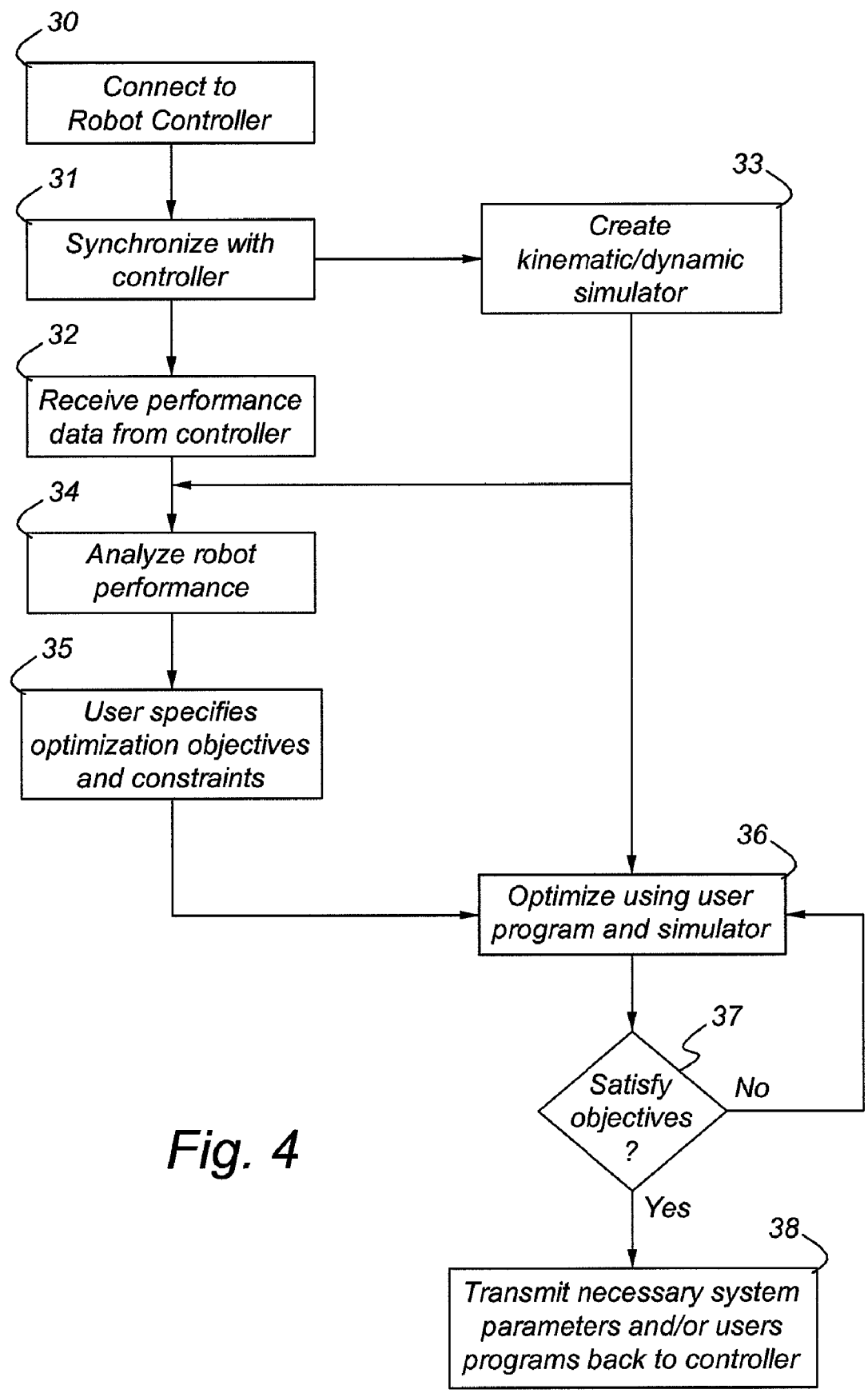
FIG. 4 is a flow diagram of the method according to the present invention.

FIG. 4 is a flow diagram for the method according to the present invention. The method begins at a "Connect to Robot Controller" instruction set 30 whereby the external PC 12 connects to the robot controller 11 as shown in FIG. 1. Then the PC executes a "Synchronize with controller" instruction set 31 wherein the PC 12 is synchronized in real time with the operation of the robot controller 11. The PC 12 receives data from the controller 11 in a "Receive performance data from controller" instruction set 32. The execution of the instruction set 31 also causes execution of a "Create kinematic/dynamic simulator" instruction set 33. The performance data received in the step 32 and the simulator created in the step 33 are used to execute an "Analyze robot performance" instruction set 34. The step 34 leads to a "User specifies optimization objectives and constraints" instruction set 35. The steps 33 and 35 lead to an "Optimize using user program and simulator" instruction set 36 that generates a potential optimized program. At "Satisfy objectives?" decision point 37, if the optimized program does not satisfy the user specified objectives, the method branches at "N" to return to the optimizer step 36. If the optimized program does satisfy the user specified objectives, the method branches at "Y" to a "Transmit necessary system parameters and/or user programs back to controller" instruction set 38 and the optimization process is complete. Now the robot controller 11 can execute the optimized program and/or change the control system parameters.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A robot control system, comprising:
   a robot;
   a first control means including a controller connected to said robot and executing a control program, said robot being operated in accordance with control system parameters specified in said control program;
   means for monitoring actual performance data of said robot during the operation of said robot; and
   a second control means connected to said controller and to said means for monitoring, said second control means being responsive to said actual performance data for automatically applying optimization routines to a kinematic/dynamic simulator to modify said control system parameters in said control program in real-time while said robot is operated by said controller.

2. The robot control system according to claim 1 wherein said second control means is a personal computer.

3. The robot control system according to claim 1 wherein said controller, said means for monitoring and said second control means are connected by a communication link for data transfer.

4. The robot control system according to claim 3 wherein said communication link is a computer network.

5. The robot control system according to claim 1 wherein said means for monitoring includes means for generating feedback signals from motors operating said robot.

6. The robot control system according to claim 5 wherein said feedback signals include motor currents of said motors.

7. The robot control system according to claim 1 wherein said second control means includes user specified optimization objectives and constraints for modifying said control system parameters.

8. In a robot system including a manipulator and a controller, a method for optimizing a robot path program within given objectives and accommodating variations in dynamic performance among otherwise similar robots, comprising the steps of:
   a. generating a path program for a robot by a conventional robot teaching method;
   b. providing a computer with a dynamic model of the robot and its control system parameters and an optimization program;
   c. providing the computer with target performance objectives;
   d. connecting the controller for communication with the computer;
   e. operating the robot by the controller executing the path program under a default set of control system parameters;
   f. monitoring a set of performance variables of the robot during operation;
   g. communicating the performance variables to the computer;
   h. executing the optimization program in the computer using the dynamic model and the performance variables to meet the target performance objectives;
   i. generating a new set of control system parameters;
   j. communicating the new set of control system parameters to the controller;
   k. assigning the new set of control system parameters to the path program as the default set of control system parameters;
   l. repeating said steps e. through k. until the new set of control system parameters is substantially similar to the default set of control system parameters resulting in an optimized default set of control system parameters, wherein said control system parameters are automatically modified in said control program in real-time while said robot is operated by said controller; and
   m. disconnecting the computer from the controller as the controller continues to operate the robot by executing the path program under the optimized default set of control system parameters.

9. The method according claim 8 wherein one of the target performance objectives is a cycle time of the robot.

10. The method according to claim 9 wherein the performance variables include axis motor current and axis encoder counts.

11. The method according claim 8 wherein one of the target performance objectives is robot path accuracy.

12. The method according to claim 11 wherein the performance variables include axis encoder errors, axis motor current, axis encoder counts, and servo gains.

13. A robot control system, comprising:
   a robot;
   a robot controller connected to said robot and executing a control program, said robot being operated in accordance with control system parameters specified in said control program;
   means for monitoring actual performance data of said robot during the operation of said robot; and
   a computer connected to said robot controller and to said means for monitoring by a communication link, said computer being responsive to said actual performance data for automatically applying optimization routines to a mathematical simulation model to modify said control system parameters in said control program in real-time while said robot is operated by said controller.

14. The robot system according to claim 13, further comprising an optimization program embedded into said second control means for analyzing said actual performance data and interacting with said mathematical model and said robot to test and modify said control system parameters until desired performance objectives are realized by said robot.

15. The robot control system according to claim 13, wherein said means for monitoring includes the mathematical simulation model of said robot.

16. The robot system according to claim 15, further comprising an optimization program embedded into said computer for analyzing said actual performance data and interacting with said mathematical model and said robot to test and modify said control system parameters until desired performance objectives are realized by said robot.

* * * * *